(12) United States Patent
Hornbrook (10) Patent No.: US 8,397,893 B2
(45) Date of Patent: Mar. 19, 2013

(54) ELECTROMAGNETIC INERTIA BRAKE FOR A MULTIPLE-RATIO POWER TRANSMISSION

(75) Inventor: Michael J. Hornbrook, Orland, IN (US)

(73) Assignee: Eaton Corporation, Cleveland, OH (US)

( * ) Notice: Subject to any disclaimer, the term of this patent is extended or adjusted under 35 U.S.C. 154(b) by 420 days.

(21) Appl. No.: 12/412,405

(22) Filed: Mar. 27, 2009

(65) Prior Publication Data

US 2010/0243403 A1 Sep. 30, 2010

(51) Int. Cl.
F16H 3/12 (2006.01)
F16D 65/18 (2006.01)

(52) U.S. Cl. ............. 192/219; 192/13 R; 192/18 B; 192/222; 188/164

(58) Field of Classification Search ............. 192/219, 192/222; 188/164
See application file for complete search history.

(56) References Cited

U.S. PATENT DOCUMENTS

| | | | |
|---|---|---|---|
| 1,851,571 A | 3/1932 | Doman | |
| 3,044,593 A * | 7/1962 | Scarrott et al. | 192/84.91 |
| 3,465,327 A | 9/1969 | Schroter et al. | |
| 3,770,087 A * | 11/1973 | Jaeschke | 192/18 B |
| 3,857,468 A | 12/1974 | Iritono et al. | |
| 3,866,729 A * | 2/1975 | Eichenhofer | 192/84.2 |
| 3,893,191 A | 7/1975 | Gold et al. | |
| 4,014,420 A | 3/1977 | Riese | |
| 4,222,471 A | 9/1980 | Hsu | |
| 4,694,945 A | 9/1987 | Koitabashi | |
| 4,844,223 A * | 7/1989 | Kempf et al. | 192/222 |
| 4,848,527 A | 7/1989 | Kamio | |
| 4,848,531 A | 7/1989 | Gray et al. | |
| 5,172,798 A | 12/1992 | Mabee | |
| 5,209,085 A | 5/1993 | Brien | |
| 5,267,635 A | 12/1993 | Peterson et al. | |
| 5,490,583 A * | 2/1996 | Anderson et al. | 188/161 |
| 5,533,425 A | 7/1996 | Mabee | |
| 5,559,286 A | 9/1996 | White et al. | |
| 5,713,445 A * | 2/1998 | Davis et al. | 192/35 |
| 5,921,780 A | 7/1999 | Myers | |
| 5,931,272 A | 8/1999 | Fukushima et al. | |
| 6,105,743 A | 8/2000 | Salecker et al. | |
| 6,139,467 A | 10/2000 | Kosik et al. | |
| 6,622,836 B2 | 9/2003 | Otto et al. | |
| 7,000,748 B2 | 2/2006 | Hornbrook et al. | |
| 2006/0060437 A1* | 3/2006 | Renner et al. | 188/266.3 |
| 2007/0095625 A1 | 5/2007 | Schenkel, III et al. | |

FOREIGN PATENT DOCUMENTS

| | | |
|---|---|---|
| EP | 0 822 354 | 5/2001 |
| GB | 878273 A | 9/1961 |
| GB | 1051296 A | 12/1966 |
| GB | 1348354 A | 3/1974 |
| WO | 2007130421 A2 | 11/2007 |

OTHER PUBLICATIONS

International Searching Authority, International Search Report and the Written Opinion for the corresponding PCT/IB2010/000688 mailed Jul. 19, 2010.

* cited by examiner

Primary Examiner — Richard M. Lorence
(74) Attorney, Agent, or Firm — Brooks Kushman P.C.

(57) ABSTRACT

An electromagnetic inertia brake for a vehicle transmission in a vehicle powertrain has a non-rotatable armature and a brake reaction plate in which a friction brake retarding force is developed on both sides of the brake reaction plate, the brake reaction plate being secured to a transmission torque input shaft, whereby rotary elements of transmission gearing are braked during a transmission shift interval to improve shift quality.

19 Claims, 5 Drawing Sheets

ELECTROMAGNETIC INERTIA BRAKE FOR A MULTIPLE-RATIO POWER TRANSMISSION

BACKGROUND OF THE INVENTION

1. Field of the Invention

The invention relates to power transmission mechanisms with a clutch brake for overcoming inertia during ratio changes.

2. Background Art

A typical powertrain for a road vehicle comprises an engine and a multiple-ratio power transmission together with a master disconnect clutch for establishing and disestablishing a power flow path from the engine through the transmission. Transmission ratio shifts are accomplished during a ratio shift interval in which the vehicle operator disengages the master clutch. A torque input shaft for the transmission must decelerate during a transmission ratio shift so that the relative speeds of gearing elements of the oncoming torque flow path are generally in synchronism. The time required to accomplish a ratio shift and to improve shift quality is dependent on deceleration rate of a transmission power input shaft. It is known design practice to increase the rate of deceleration by using an inertia brake for the power input shaft during a shift interval, thereby improving shift quality.

An example of a transmission input shaft inertia brake with an electromagnetic brake actuator is disclosed in U.S. Pat. No. 7,000,748. That patent is assigned to the assignee of the present invention. The brake includes an armature that frictionally engages a stationary friction surface on a transmission housing thereby retarding rotation of the transmission torque input shaft at the onset of a ratio shift.

Another example of an electromagnetic inertia brake is disclosed in U.S. patent publication 2007/0095625, which also is assigned to the assignee of the present invention. An armature hub disclosed in that publication is drivably connected to the power input shaft of the transmission, such as by a spline or keyway and key connection. An armature plate is secured to the armature hub by a flexible drive plate. When the electromagnetic coil windings are energized, the flexible drive plate allows the armature to frictionally engage a friction surface for the transmission housing. The braking capacity of the electromagnetic brake of the patent publication is determined by the friction torque developed on a single side of the armature.

SUMMARY OF THE INVENTION

The inertia brake of the present invention is capable of substantially increased braking capacity for the power input shaft of a multiple-ratio transmission. Unlike the design of the '625 patent publication, the armature of the inertia brake of the present invention does not rotate with the power input shaft of the transmission. Rather, it is fixed to the transmission housing. Provision is made for allowing the armature to adjust axially in the direction of the transmission power input shaft, although it is prevented from moving rotatably relative to the transmission housing. The armature may be biased in an axial direction, which tends to separate the armature from the transmission housing. A reaction plate is situated between the movable, non-rotating armature and the transmission housing. The reaction plate, in turn, is connected to a reaction plate hub. A driving connection, such as a spline or keyway, connects the hub to the transmission power input shaft. An annular friction surface of the reaction plate frictionally engages a friction surface on the transmission housing and another friction surface of the reaction plate frictionally engages the movable non-rotating armature. The dual friction surface feature improves braking capacity.

According to one aspect of the invention, the non-rotating armature is spaced from the transmission housing and the reaction plate is located in the space between the transmission housing and the armature. Electromagnetic coil windings are disposed in the housing at an interface of the reaction plate and the transmission housing. The coil windings create a flux field that causes a clutch engaging force on the armature.

In another embodiment of the invention, the housing has a main housing portion and a second housing portion that are spaced apart, the non-rotatable armature and the reaction plate being disposed between the housing portions. The coil windings are located in the second housing portion. This facilitates repair and servicing of the brake without fully disassembling the brake assembly.

According to another feature of the invention, a torsional damper is disposed between the reaction plate and the power input shaft to attenuate or dampen torsional oscillations as the inertia brake is applied.

BRIEF DESCRIPTION OF THE DRAWINGS

FIG. 2 is a cross-sectional view of the electromagnetic brake of the invention as seen from the plane of section line 2-2 of FIG. 2a;

FIG. 3 is a cross-sectional view of the electromagnetic brake of the invention including damper springs as seen from the plane of section line 3-3 of FIG. 3a;

FIG. 5 is a cross-sectional view of an alternate embodiment of the invention as seen from the plane of section line 5-5 of FIG. 5a;

PARTICULAR DESCRIPTION OF EMBODIMENTS OF THE INVENTION

Figure 1:
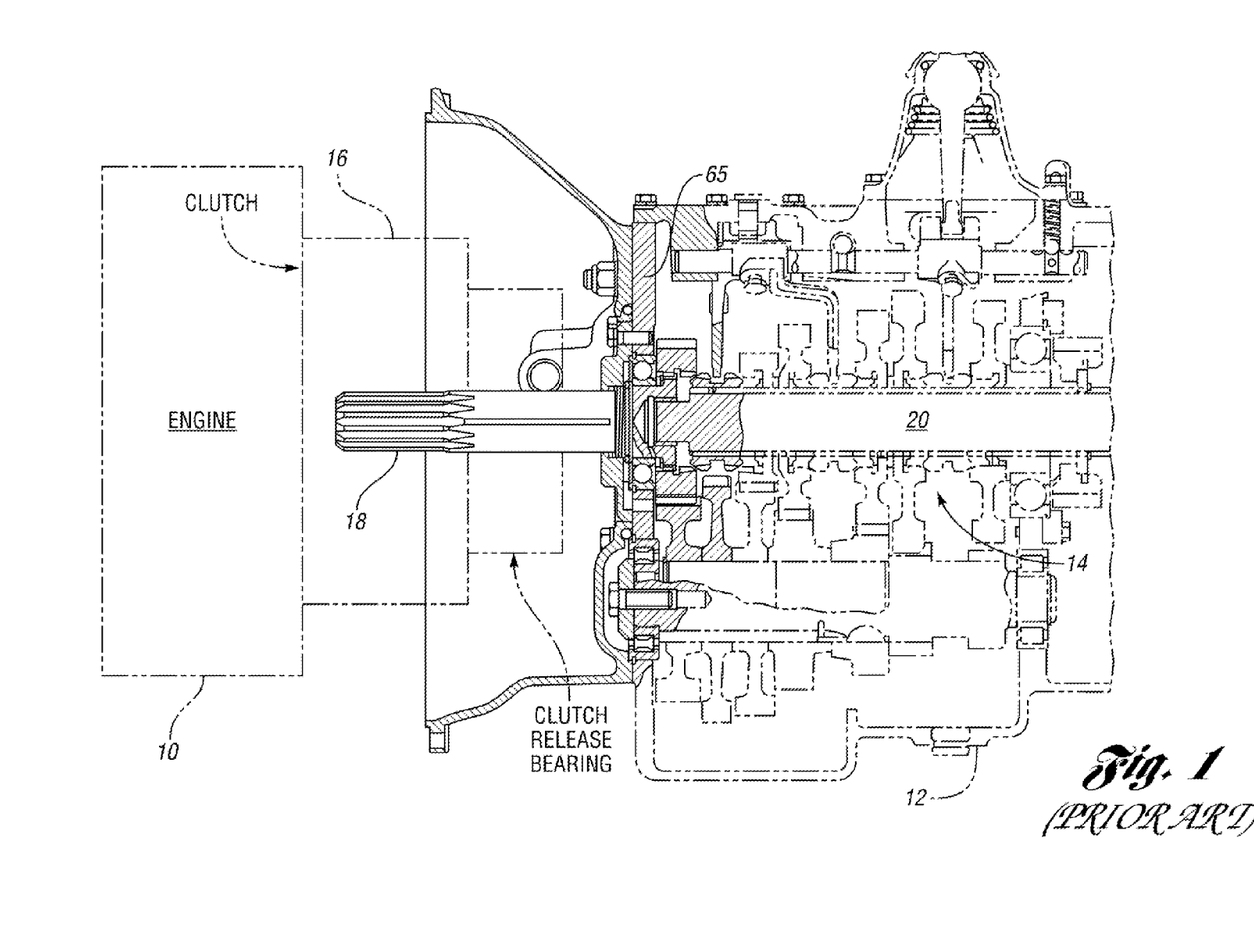
FIG. 1 is a schematic diagram of a typical heavy-duty master clutch, a transmission with multiple-ratio gearing and a clutch release bearing for engaging and disengaging the master clutch.

FIG. 1 shows in schematic form a vehicle powertrain comprising an engine 10, a multiple-ratio power transmission 12 having multiple-ratio gearing 14 and a master clutch 16 with a driver-actuated clutch release bearing. The master clutch can be opened and closed by a vehicle operator to establish and disestablish a mechanical power flow path from engine 10 to transmission power input shaft 18 and to the transmission gearing 14.

The transmission has a power input shaft 18, which is drivably splined to an engine crankshaft through master clutch 16.

A transmission mainshaft 20 delivers driving torque to a transmission power output shaft, which is drivably connected to vehicle traction wheels through a driveshaft and a differential and axle assembly. Reference may be made to U.S. patent publication 2007/0095625 for a description of a typical master clutch that can be used in this environment.

Figure 2:
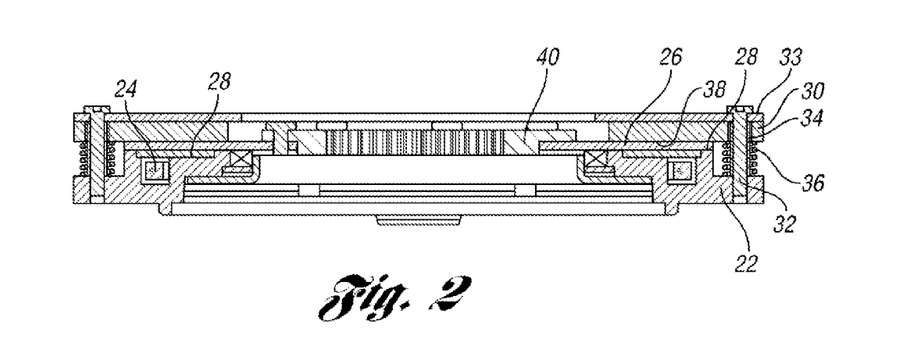
Figure 2A:
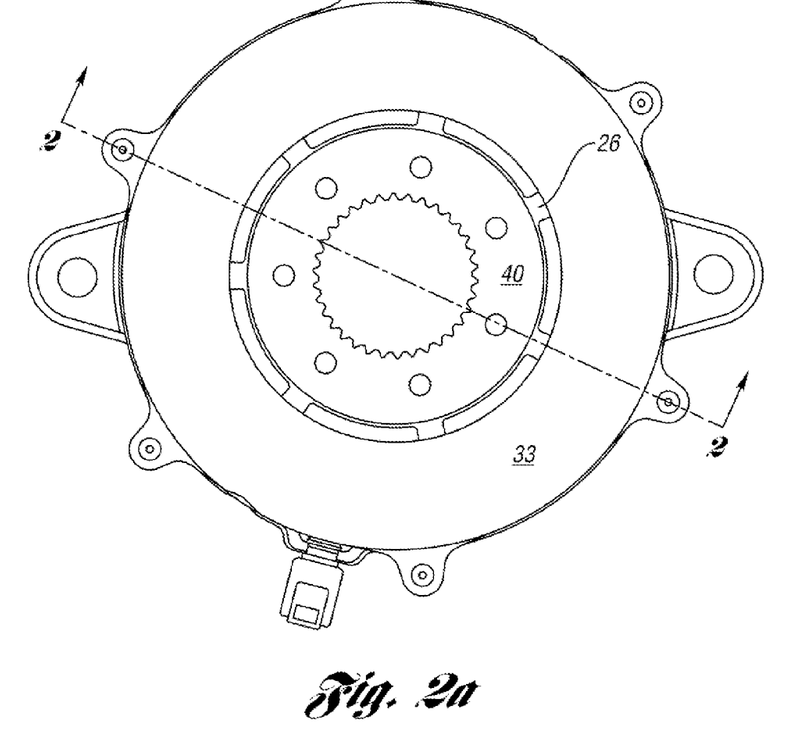
FIG. 2a is an axial view of the electromagnetic brake as seen from the left side of the transmission illustrated schematically in FIG. 1.

FIG. 2 is a cross-sectional view of the inertia brake of the present invention. A portion of the transmission housing, shown at 22, has an annular space that receives coil windings of an electromagnetic solenoid brake coil 24. An annular reaction brake plate 26 is situated adjacent an annular friction brake surface 28 on housing portion 22. An armature plate 30 is secured to housing portion 22 by a plurality of studs 32, which extend through oversize openings in armature plate 30 and through openings in annular cover plate 33. Sleeves 34 surrounding studs 32 serve as spacers between the armature plate 30 and the housing portion 22. The spacers are surrounded by coil springs 36, which establish a calibrated separation force between the housing portion 22 and the armature plate 30. The armature plate 30 thus is non-rotatable, but it is movable axially.

Reaction plate 26 engages the annular friction surface 38 on the non-rotatable armature plate. The reaction plate 26 is secured, as shown, to an internally splined hub 40, which is splined to a splined transmission input shaft corresponding to shaft 18 in the prior art construction shown in FIG. 1. Reaction plate 26 thus rotates with the transmission power input shaft on the torque flow downstream side of the master clutch.

When coil 24 is energized, the armature plate is drawn toward the reaction plate 26. A retarding force on the transmission torque input shaft is created by the friction torque on each annular surface of the reaction plate 26. This essentially doubles the reaction torque that would be available in an inertia brake design of the type disclosed in U.S. patent publication 2007/0095625 and U.S. Pat. No. 7,000,748. This will make it possible to increase the rate of deceleration of the input shaft during a ratio shift event, which reduces the ratio shift time. The inertia effect of the rotating mass of a clutch and armature assembly of the type shown in these references is not present in the design of the present invention. The only rotating mass of the inertia brake of the present invention is the mass of the rotating reaction plate 26. This feature also contributes to a reduction in the time required to execute a ratio change.

The inertia brake retarding force occurs when the electric coil assembly is excited or energized. This generates a magnetic field, which pulls the non-rotating armature into frictional engagement with the rotating armature plate and the armature plate is brought into frictional engagement with the friction surface of the housing portion 22.

Figure 3:
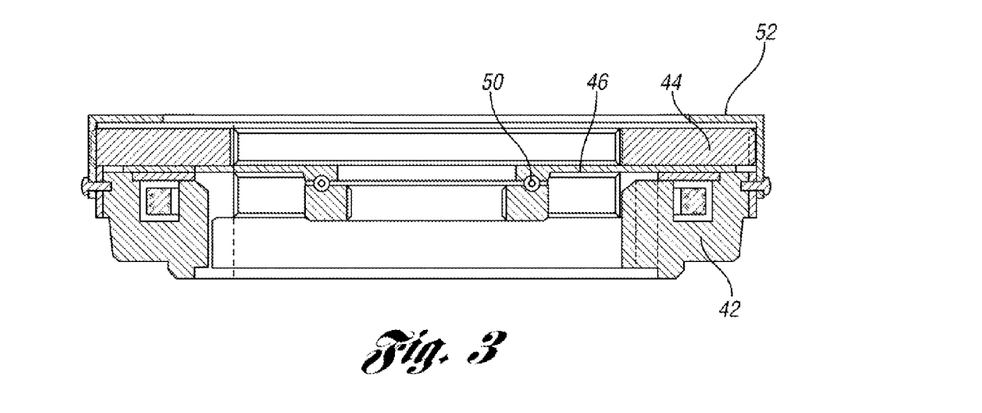
Figure 3A:
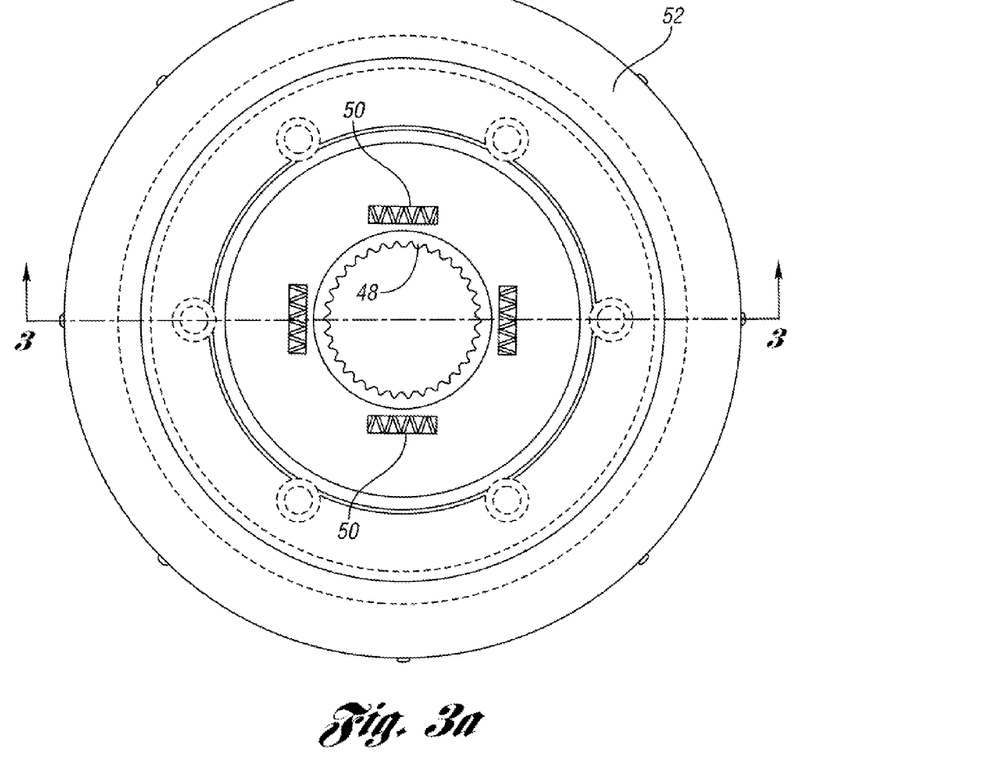
FIG. 3a is an axial view of the electromagnetic brake of the invention as seen from the left side of the transmission seen in FIG. 1.

FIG. 3 discloses a modified design with a housing portion 42, which corresponds to the housing portion 22 of FIG. 2. A non-rotatable armature 44 is located on one side of rotating reaction plate 46. Reaction plate 46 is positioned between a frictional annular surface on the armature 44 and a frictional annular surface of the housing portion 42. The rotating reaction plate 46 frictionally engages the armature 44 and the annular surface of the housing portion 42. Plate 46 is coupled to a reaction plate hub 48 by damper springs 50, which are spaced about the axis of the hub 48 in tangential disposition with respect to the central axis of the brake assembly, as shown in FIG. 3A. This establishes a resilient connection between the transmission power input shaft and the plate 46, which attenuates torsional disturbances upon engagement of the inertia brake.

Armature 44 is secured to housing portion 42 by a bracket 52 having a periphery that is secured to the outer periphery of the housing portion 42. The periphery of the armature 42 is drivably and slidably connected, such as by interlocking spline elements, to the outer periphery of the bracket 42. This connection permits the armature 44 to shift in the direction of the axis of the inertia brake, although rotary motion of the armature plate 44 is prevented. Upon excitation, the electric coil assembly generates a magnetic field that pulls armature plate 44 across an air gap.

Figure 4:
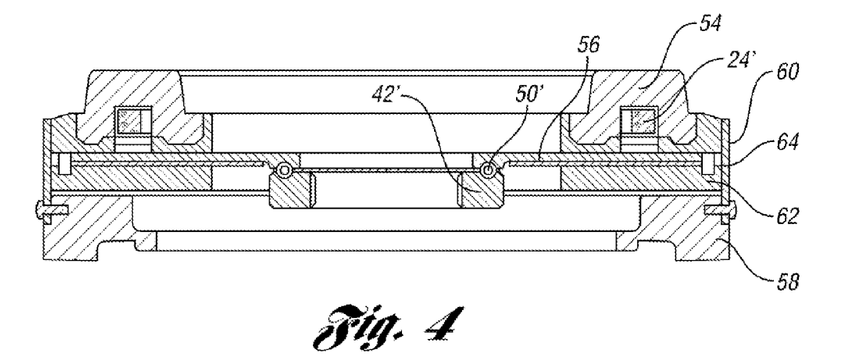
FIG. 4 is a cross-sectional view of the electromagnetic brake of the invention wherein the electromagnetic coil is relocated relative to the coil location of FIG. 3.

FIG. 4 shows another modified design with a different arrangement for the electromagnetic coils of the electromagnetic brake. A housing portion 54 of FIG. 4 has a ring with an annular opening that receives the electromagnetic coil 24'. Housing portion 54 is joined to housing portion 58 by a bracket 60. A non-rotatable armature 62 is located between housing portion 54 and housing portion 58. The armature 62 is externally keyed or splined at 64 to bracket 60 to permit axial movement of the armature while preventing rotary motion of armature 62 relative to housing portions 54 and 58. Reaction plate 56 is located between the armature 62 and housing portion 54. Friction material can be provided on either, or both, of the annular friction surfaces of the armature reaction plate 56.

The assembly illustrated in FIG. 4 can be secured to the transmission housing by mounting bolts or studs supported by a bearing support wall or a bearing cap of the type seen in the transmission illustrated in FIG. 1 at 65.

Figure 5:
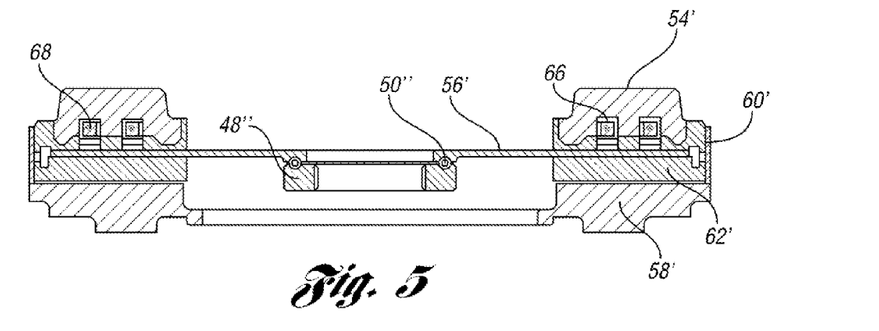
Figure 5A:
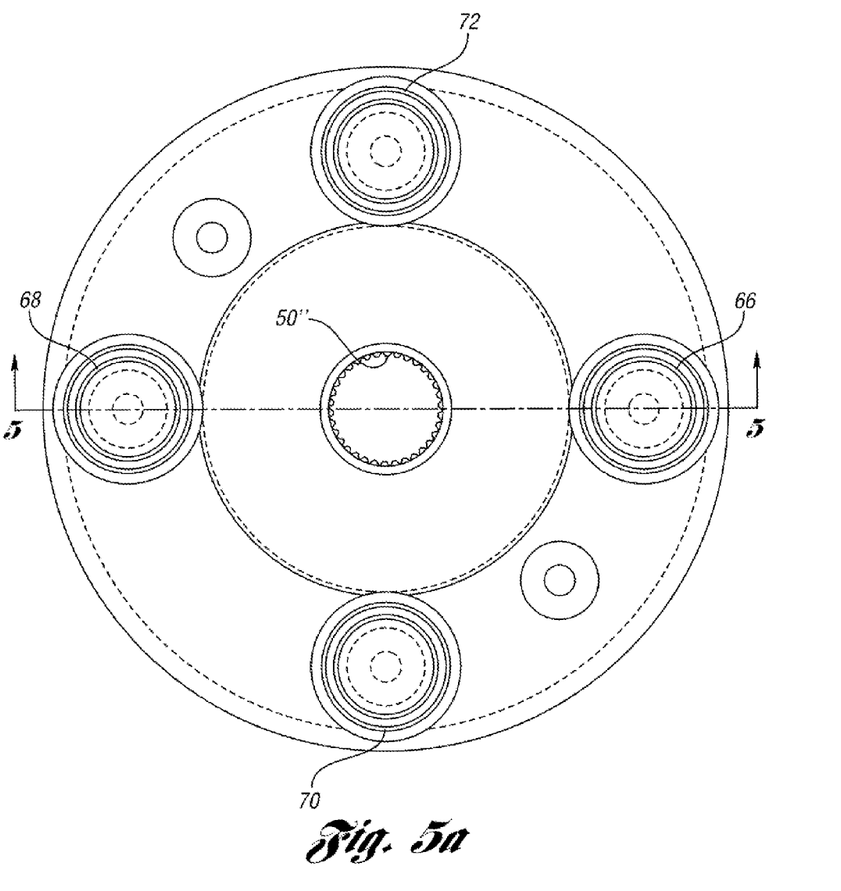
FIG. 5a is an axial view of the alternate embodiment of the invention of FIG. 5 as seen from the left side of the transmission illustrated in FIG. 1.

FIGS. 5 and 5a show a variation of the inertia brake design illustrated in FIG. 4. Unlike the inertia brake of FIG. 4, the housing portion 54' seen in FIG. 5 has multiple electromagnetic clutch coil windings. A pair of coil windings is seen at 66 and 68 in FIG. 5, and another pair is seen at 70 and 72 in FIG. 5a. A different number of coil windings could be used as well. As in the case of the design of FIG. 4, the electromagnetic coil windings create a magnetic field, which pulls the non-rotating armature 62' toward the housing portion 54'. This creates frictional torque on the frictional surfaces for the rotating reaction plate that engage the armature 62' and the friction surface of the housing portion 54'.

Elements of the electromagnetic brake of FIG. 5 have numerals that correspond to numerals for corresponding elements of the design of FIG. 4, although prime notations are added to the numerals of FIG. 5.

Figure 6:
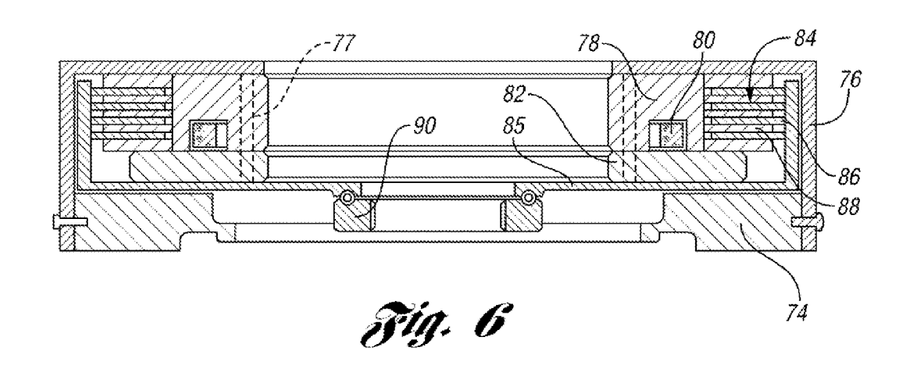
FIG. 6 is another alternate embodiment of the invention wherein the armature reaction plate is frictionally engageable with a multiple disk clutch assembly connected to the transmission housing.

FIG. 6 shows another embodiment of the invention. A housing portion 74 has a bracket 76 that secures housing portion 74 to an annular housing portion 78. Housing portion 78 has a circular cavity or opening that receives the coil windings 80 of the electromagnetic brake. Annular armature 82 is non-rotatably and slidably secured by a connection, such as by mounting studs or posts 77, to housing portion 78. The annular armature 82 engages a multiple disk brake assembly 84, which comprises externally splined disks 86 connected to rotary reaction plate 85, and internally splined disks 88 splined to housing portion 78. When the electromagnetic coil windings are energized, armature 82, connected slidably by posts 77 to housing portion 78, engages the friction disks, thereby retarding the hub 90, which is splined or otherwise secured to the transmission power input shaft. This design of FIG. 6 may provide increased braking capacity because of the multiple friction surfaces provided by the brake assembly 84.

Although embodiments of the invention have been disclosed, it will be apparent to persons skilled in the art that modifications may be made without departing from the scope of the invention. All such modifications and equivalents thereof are intended to be covered by the following claims.

What is claimed is:

1. An electromagnetic inertia brake for retarding speed of a power input shaft for a multiple ratio transmission in a powertrain for an engine-powered vehicle during a transmission ratio shift, the inertia brake comprising:
   at least one electromagnetic brake coil positioned on a housing for the transmission, the brake coil being spaced radially from the power input shaft;
   an electromagnetic brake armature surrounding the power input shaft, the armature being fixed to the housing by a connector so as to prevent rotational movement of the armature while permitting axial movement of the armature; and
   a reaction plate connected drivably to the power input shaft, the reaction plate being disposed between the electromagnetic brake armature and the housing;
   whereby the armature applies a clutch friction engaging force on the reaction plate as the brake coil is electrically energized thereby developing a rotary braking torque on the power input shaft during a transmission ratio shift interval,
   a plurality of brake disks carried by the reaction plate and the housing, wherein at least one brake disk is externally splined to the reaction plate, and at least one other brake disk is internally splined to the housing,
   wherein the reaction plate has friction surfaces on each side thereof, one side frictionally engaging the armature and the other side frictionally engaging a friction surface on the housing,
   whereby the rotary braking torque on the power input shaft is established on each side of the reaction plate and the brake disks.

2. The electromagnetic inertia brake set forth in claim 1 wherein the reaction plate includes a hub fixed to the power input shaft and an annular disk portion disposed between the armature and the housing, the hub being drivably connected to the power input shaft.

3. The electromagnetic inertia brake set forth in claim 2 wherein the reaction plate comprises torsional damper elements between the reaction plate hub and the annular disk portion whereby torsional disturbances in the inertia brake are attenuated when the inertia brake is applied.

4. The electromagnetic inertia brake as set forth in claim 1 wherein the housing comprises first and second housing portions that are axially spaced, the armature being disposed between the housing portions and secured to the housing portions;
   a connection between the armature and a first housing portion accommodating axial movement of the armature while preventing rotary motion of the armature about the power input shaft;
   the reaction plate being frictionally engaged with the first housing portion by the armature when the brake coil is energized as an air gap is opened between the armature and the second housing portion.

5. The electromagnetic inertia brake set forth in claim 4 wherein one of the first and second housing portions carries at least one electromagnetic brake coil.

6. The electromagnetic inertia brake set forth in claim 5 wherein the at least one electromagnetic brake coil and the first housing portion are adapted to be separable from the second housing portion whereby the electromagnetic brake may be removed from the second housing portion for servicing procedures.

7. The electromagnetic inertia brake set forth in claim 4 wherein one of the first and second housing portions carries multiple brake coils spaced about the power input shaft.

8. The electromagnetic inertia brake set forth in claim 1 wherein the armature includes at least one aperture, wherein the connector extends through the aperture in the armature to non-rotatably connect the armature to the housing.

9. An electromagnetic inertia brake for retarding speed of a power input shaft for a multiple ratio transmission in a powertrain for an engine-powered vehicle during a transmission ratio shift, the inertia brake comprising:
   at least one electromagnetic brake coil positioned on a housing for a transmission, the at least one brake coil being spaced radially from the power input shaft;
   a reaction plate connected drivably to the power input shaft;
   a non-rotating armature adjacent the brake coil and the reaction plate; and
   a multiple disk brake assembly having multiple disk surfaces connected to the reaction plate, the multiple disk brake assembly including at least one externally splined disk connected to the reaction plate, and at least one internally splined disk splined to the housing,
   wherein the armature moves in an axial direction to apply a clutch friction engaging force on the multiple disk brake disk assembly when the at least one brake coil is energized so that the at least two multiple disk surfaces of the brake disk assembly engage the housing to establish apply a rotary braking torque on the reaction plate, the reaction plate thereby retarding the speed of the power input shaft during a transmission ratio shift.

10. The electromagnetic inertia brake set forth in claim 9 further comprising at least one mounting post wherein the armature is slidable in the axial direction along the mounting post.

11. The electromagnetic inertia brake set forth in claim 9 wherein the brake disk assembly further comprises at least one brake disk extending from the reaction plate and another brake disk extending from the transmission housing.

12. An electromagnetic inertia brake for a power input shaft for a multiple ratio transmission, the inertia brake comprising:
   at least one electromagnetic brake coil positioned on a housing for the transmission, the brake coil being spaced radially from the power input shaft;
   a non-rotating armature adjacent the power input shaft, the armature being fixed to the housing in order to prevent rotational movement of the armature; and
   a reaction plate connected drivably to the power input shaft, the reaction plate having at least two friction surfaces, one of the friction surfaces frictionally engaging the armature and the other of the friction surfaces frictionally engaging the housing;
   a brake disk assembly connected to the reaction plate and having including at least one externally splined disk connected to the reaction plate, and at least one internally splined disk splined to the housing,
   wherein the armature moves in an axial direction to apply a clutch friction engaging force on the reaction plate when the brake coil is electrically energized such that a rotary braking torque is established along the two friction surfaces on the reaction plate and the brake disks, the reaction plate and the brake disks thereby retarding the speed of the power input shaft during a transmission ratio shift interval.

13. The electromagnetic brake set forth in claim 12 further comprising at least one mounting post wherein the armature is slidable in the axial direction along the mounting post.

14. The electromagnetic inertia brake set forth in claim 12 wherein the reaction plate includes a hub fixed to the power input shaft and an annular disk portion disposed between the armature and the housing, the hub being drivably connected to the power input shaft.

15. The electromagnetic inertia brake set forth in claim 14 wherein the reaction plate comprises torsional damper elements between the reaction plate hub and the annular disk portion whereby torsional disturbances in the inertia brake are attenuated when the inertia brake is applied.

16. The electromagnetic inertia brake as set forth in claim 12 wherein the housing comprises first and second housing portions that are axially spaced, the armature being disposed between the housing portions and secured to the housing portions;

a connection between the armature and a first housing portion accommodating axial movement of the armature while preventing rotary motion of the armature about the power input shaft;

the reaction plate being frictionally engaged with the first housing portion by the armature when the brake coil is energized as an air gap is opened between the armature and the second housing portion.

17. The electromagnetic brake set forth in claim 16 wherein one of the first and second housing portions carries at least one electromagnetic brake coil.

18. The electromagnetic brake set forth in claim 17 wherein the at least one electromagnetic brake coil and the first housing portion are adapted to be separable from the second housing portion whereby the electromagnetic brake may be removed from the second housing portion for servicing procedures.

19. The electromagnetic brake set forth in claim 16 wherein one of the first and second housing portions carries multiple brake coils spaced about the power input shaft.

* * * * *

UNITED STATES PATENT AND TRADEMARK OFFICE
CERTIFICATE OF CORRECTION

| | | |
|---|---|---|
| PATENT NO. | : 8,397,893 B2 | Page 1 of 1 |
| APPLICATION NO. | : 12/412405 | |
| DATED | : March 19, 2013 | |
| INVENTOR(S) | : Michael J. Hornbrook et al. | |

It is certified that error appears in the above-identified patent and that said Letters Patent is hereby corrected as shown below:

In the Claims

Column 6, Line 28, Claim 9:

After "a multiple disk brake"
Delete "disk"

Column 6, Line 29, Claim 9:

After "energized so that the"
Delete "at least two"

Column 6, Line 31, Claim 9:

After "disk surfaces"
Delete "of the brake disk assembly engage the housing to establish"

Column 6, Line 59, Claim 12:

After "a brake disk assembly connected to the reaction plate and"
Delete "having"

Signed and Sealed this
Eleventh Day of March, 2014

Michelle K. Lee
*Deputy Director of the United States Patent and Trademark Office*